United States Patent [19]

Hinson-Rider

[11] 4,051,835

[45] Oct. 4, 1977

[54] SOLAR HEATING PIPE

[76] Inventor: George Hinson-Rider, 300 Circle Drive, Santa Fe, N. Mex. 87501

[21] Appl. No.: 632,510

[22] Filed: Nov. 17, 1975

[51] Int. Cl.² .............................................. F24J 3/02
[52] U.S. Cl. ................................................ 126/271
[58] Field of Search ............... 126/270, 271; 237/1 A

[56] References Cited
U.S. PATENT DOCUMENTS

| 1,989,999 | 2/1935 | Niederle | 126/271 |
| 3,022,781 | 2/1962 | Andrassy | 126/271 |
| 3,125,091 | 3/1964 | Sleeper, Jr. | 126/271 |
| 3,901,036 | 8/1975 | Martin | 126/271 |

Primary Examiner—Kenneth W. Sprague
Attorney, Agent, or Firm—Brown & Martin

[57] ABSTRACT

A fluid carrying pipe having an integral transparent portion formed into a longitudinally extending cylindrical lens that focuses solar heat rays to a focal axis within the volume of the pipe, and which pipe on the side opposite the lens has a heat ray absorbent coating for absorbing heat from light rays that pass through the focal axis.

4 Claims, 4 Drawing Figures

U.S. Patent   Oct. 4, 1977   4,051,835
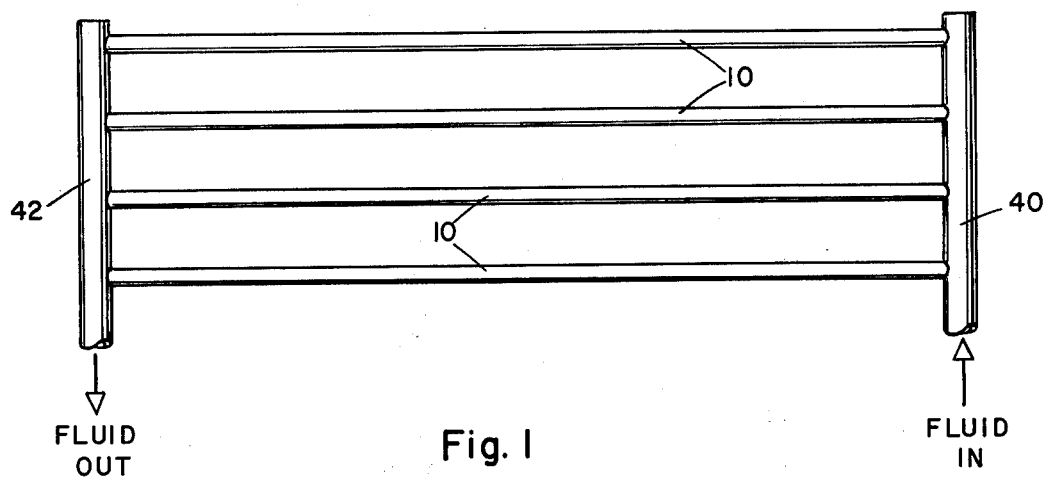
FLUID OUT    Fig. 1    FLUID IN
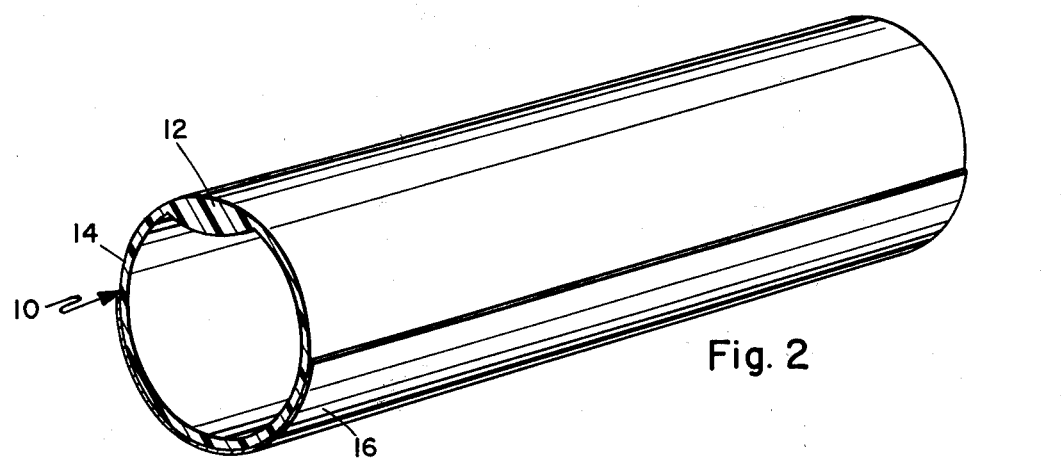
Fig. 2
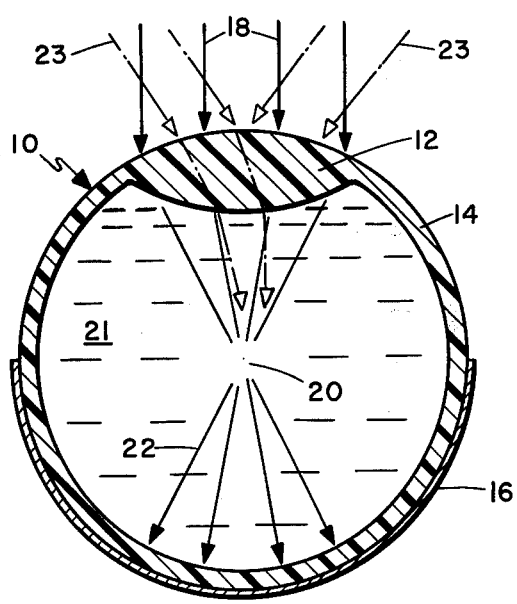
Fig. 3
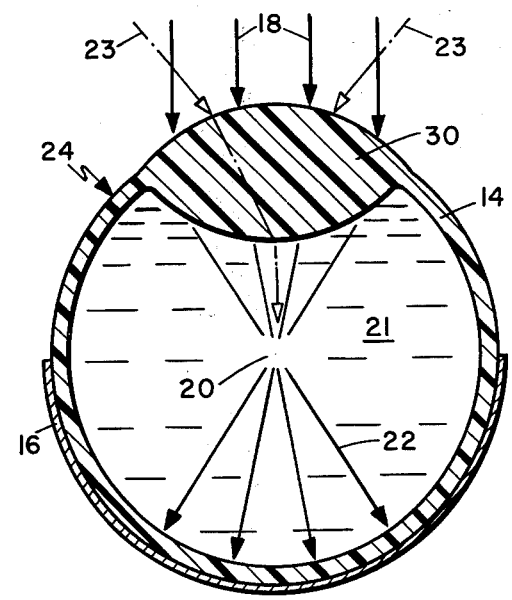
Fig. 4

SOLAR HEATING PIPE

BACKGROUND OF THE INVENTION

There are many different devices and systems for utilizing solar heat rays to heat liquids such as water. Too often these devices utilize complex and expensive structures that as a practical matter, are difficult and expensive to use, do not adjust to the movement of the sun without complex mechanical structures, and do not efficiently transform the light rays into usable heat energy in the fluid. Thus while there are large demands for such heated fluid, as in heating systems for houses, swimming pools and the like, practical and commercially feasible structures to transform light rays into heated water have yet to be devised.

So it is advantageous to have a relatively simple and easy to construct and use device for focusing heat rays from sun light into a fluid medium, such as water or the like, and to efficiently heat same while maximizing the heat from the light rays received.

SUMMARY OF THE INVENTION

In a preferred embodiment of this invention, a longitudinal length of fluid conducting pipe is made of a suitable plastic or other suitable materials that are formed into a transparent conduit with at least one integral longitudinal portion being formed into a cylindrical lens. The pipe in use is so positioned that the solar heat rays strike the lens portion of the pipe in movement of the sun across the sky. This maximizes the heat rays passing into the pipe, as the lens focuses the heat rays into a focal axis within the pipe. Also the opposite side of the pipe is coated with a light ray absorbing material, which can be a black coating, to further maximize the absorption of the heat rays received.

Thus a single extruded length of pipe forms the water containing conduit, the lens system for focusing heat rays into the water in the pipe, and a light rays absorption member. No separate lens is required and the lens itself is protected by being integral with the pipe. The extruding device for extruding the pipe provides the transparent portion of the lens. Thus the lens and pipe combination, being integral, can be relatively, inexpensively manufactured.

It is therefore an object of this invention to provide a new and improved solar heating pipe.

Other objects and many advantages of this invention will become more apparent upon a reading of the following detailed description and an examination of the drawing, wherein like reference numerals designate like parts throughout and in which:

FIG. 1 illustrates a typical solar heating array utilizing lengths of the pipe of this invention.

FIG. 2 is a perspective view of a portion of the pipe.

FIG. 3 is an enlarged diametrical sectional view of the pipe.

FIG. 4 is a similar sectional view, showing an alternate lens construction.

Referring now to the drawing and FIGS. 2 and 3, the pipe 10 comprises a longitudinal length of integral pipe 14 that has a longitudinally extending lens portion 12 that may be cylindrical lens, or any other suitable elongated lens element. With reference to FIG. 3, the light rays 18 may pass directly through the lens portion 12 and are focused into a focal axis or hot spot 20. The light rays that pass on, such as rays 22, then pass through the cylindrical volume to the other side of the pipe 10 and contact the absorbent coating 16 that retains the light ray heat in the pipe for heating the water 21.

It may be understood that the pipes 10 in an array between inlet and outlet manifolds 40 and 42, respectively, as illustrated in FIG. 1, may be positioned so that the light rays in a normal mid-location of the sun, pass into the lens as illustrated in FIG. 3. The variance in north-south angle of the sun in east to west movement is only about 6°. So the light rays vary only slightly in north and south directions and thus pass through the lens portion 12 into the focal axis 20. The early morning sun light rays and late evening sun light rays 23 contact the lens section 12 at a side angle, but are still focused in the manner described.

The lens portion 12 in FIG. 3 is constructed so that the outer surface of the pipe is circular. In FIG. 4, the cylindrical lens 30 protrudes outwardly from the outer surface of the pipe 24, which is otherwise similar to pipe 10. The pipes 10 or 24 may be made in any suitable manner, preferably by extruding. While the pipe is transparent, the lower half portion could be translucent. The absorbent coating 16 is illustrated as being applied to the outer surface of the lower portion of the pipe to provide for ease of construction.

Thus the pipe is extruded into the end product, which contains its own thin lens system for focusing sun light into maximum transfer of the solar heat rays to the fluid medium 21. The lens 12 of FIG. 3 or lens 30 of FIG. 4 may take any longitudinal shape as desired to provide the particular focusing that maximizes the transfer of solar heat rays into a focal axis within the volume of the pipe to achieve maximum heat transfer.

Having described my invention, I now claim.

1. A solar heating pipe comprising,
    a fluid conducting pipe,
    at least one integral longitudinal portion of said pipe being transparent to solar heat rays,
    said portion being parallel with the longitudinal axis of said pipe,
    said portion comprising a cylindrical lens that focuses the solar heat rays to a focal axis within the volume of said pipe,
    and the side of said pipe opposite said lens portion being coated with a light ray absorbent coating.
2. A solar heating pipe as claimed in claim 1 in which, said lens portion comprising a bi-convex cylindrical lens.
3. A solar heating pipe as claimed in claim 1 in which, the outer surface of said pipe being circular and the lens portion extending inwardly from the inner surface of the remaining wall portion of the pipe.
4. A solar heating pipe as claimed in claim 1 in which, said absorbent coating covering approximately one half of the surface of said pipe, with the center portion of said coating being directly opposite from the center portion of said longitudinally extending cylindrical lens.

* * * * *